INVENTOR.
Ray D. Hulslander.
BY Ely & Barrow
ATTORNEYS.

Nov. 11, 1930.  R. D. HULSLANDER  1,781,665
APPARATUS FOR REMOVING ARTICLES FROM MOLDS
Filed April 1, 1929    4 Sheets-Sheet 4

INVENTOR.
Ray D. Hulslander.
BY Ely & Barrow
ATTORNEYS.

Patented Nov. 11, 1930

1,781,665

UNITED STATES PATENT OFFICE

RAY D. HULSLANDER, OF AKRON, OHIO, ASSIGNOR TO THE FIRESTONE TIRE & RUBBER COMPANY, OF AKRON, OHIO, A CORPORATION OF OHIO

APPARATUS FOR REMOVING ARTICLES FROM MOLDS

Application filed April 1, 1929. Serial No. 351,609.

This invention relates to apparatus for removing articles such as pneumatic tire casings from the molds in which they are formed or vulcanized.

In the manufacture of pneumatic tires, for example, sectional vulcanizing molds are employed and in large tire factories these are usually conveyed in a path about a series of vulcanizers in which the molds are mounted during vulcanization. The molds are opened and the lids thereof are conveyed along an elevated path at one station in the conveying system at which completed tires are removed, the surfaces of the molds cleaned or treated and raw tires inserted.

Heretofore, after the mold lids have been removed the tires have been removed from the lower mold sections by operatives using crowbars or the like which they force down under the tires to lift the tire out of the mold. There is, of course, a strong adhesion of the tire to the mold and this task as manually performed, has been an exceedingly laborious one requiring a number of strong heavily built men at each conveyor, and damage to the tires often resulted from the action of the crowbars thereon.

The objects of the present invention are to provide a simple effective device for automatically removing the tires from the molds as they pass along on the conveyor, whereby the manual labor for this purpose can be dispensed with, and whereby the tires will not be damaged and also to provide means whereby the tires can be effectively conveyed automatically from the mold stripping device to any desired point in the factory for subsequent handling or treatment.

The foregoing and other objects of the invention are attained in the apparatus illustrated in the accompanying drawings and described below. It is to be understood that the invention is not limited to the specific form thereof shown and described.

Of the accompanying drawings,

Figure 5 is a detail section of the stripping element and its bolster;

Figure 1:
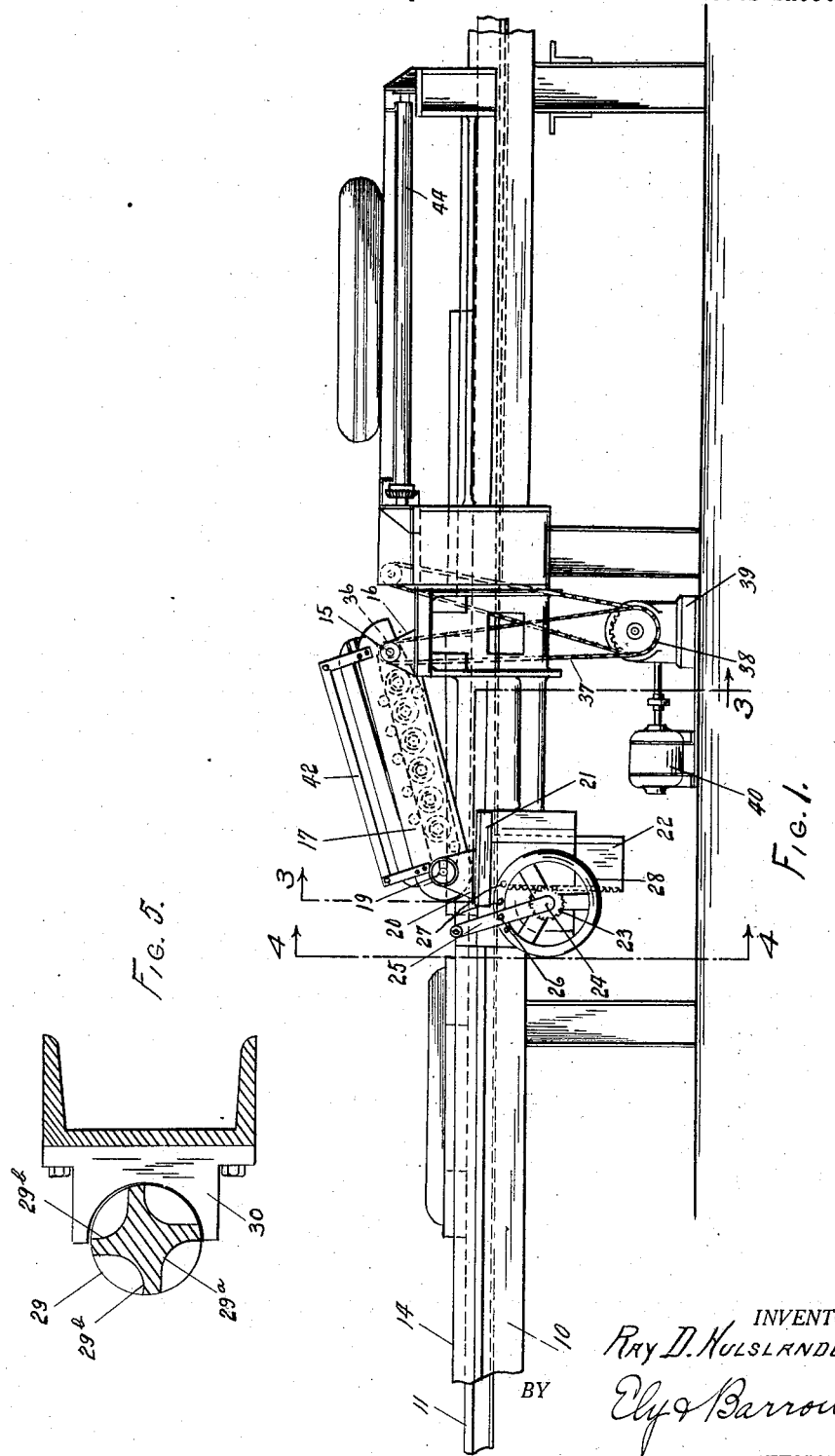
Figure 1 is a side elevation of apparatus embodying the invention shown in operative relation in a tire mold conveying system.
Figure 2:
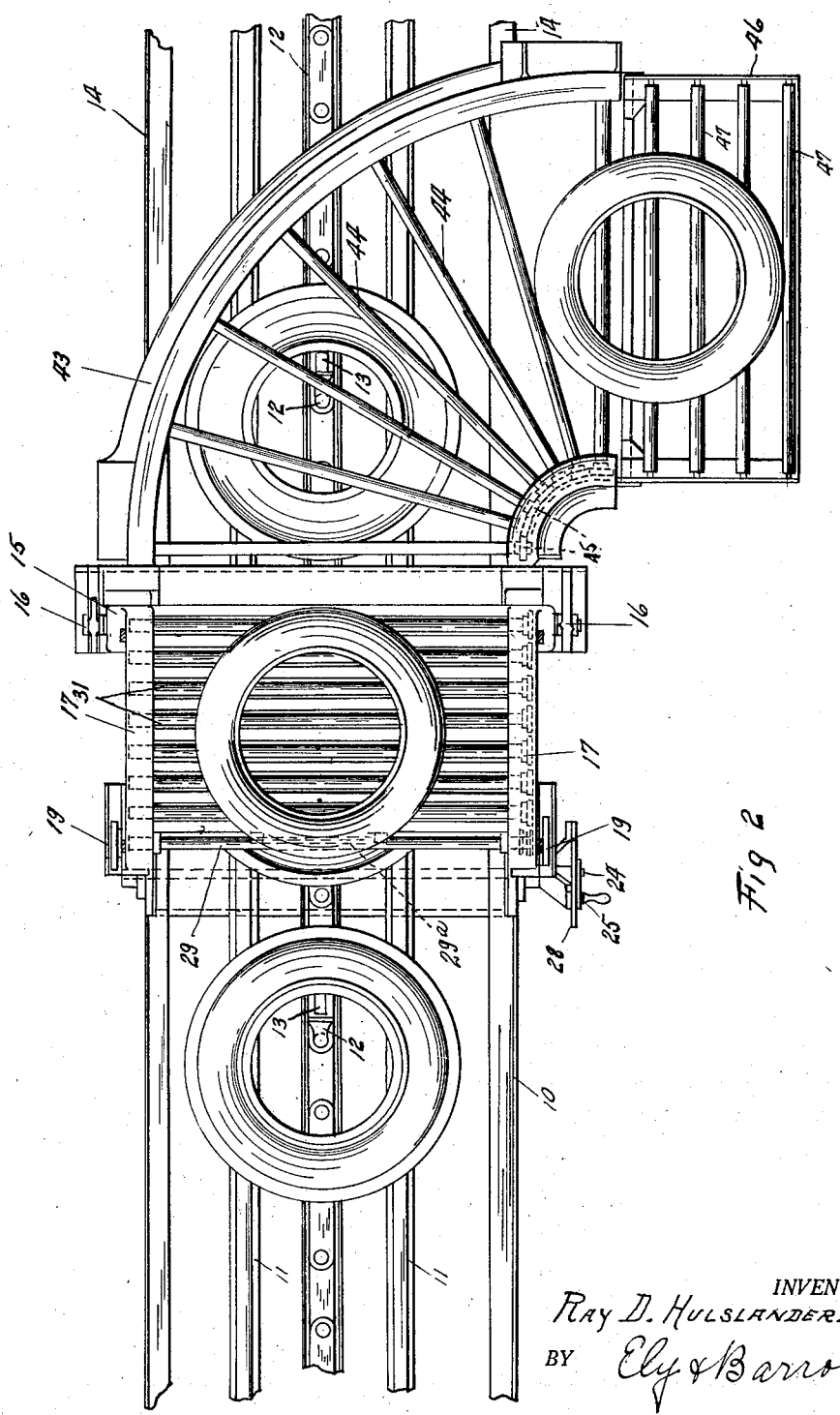
Figure 2 is a plan thereof.
Figure 3:
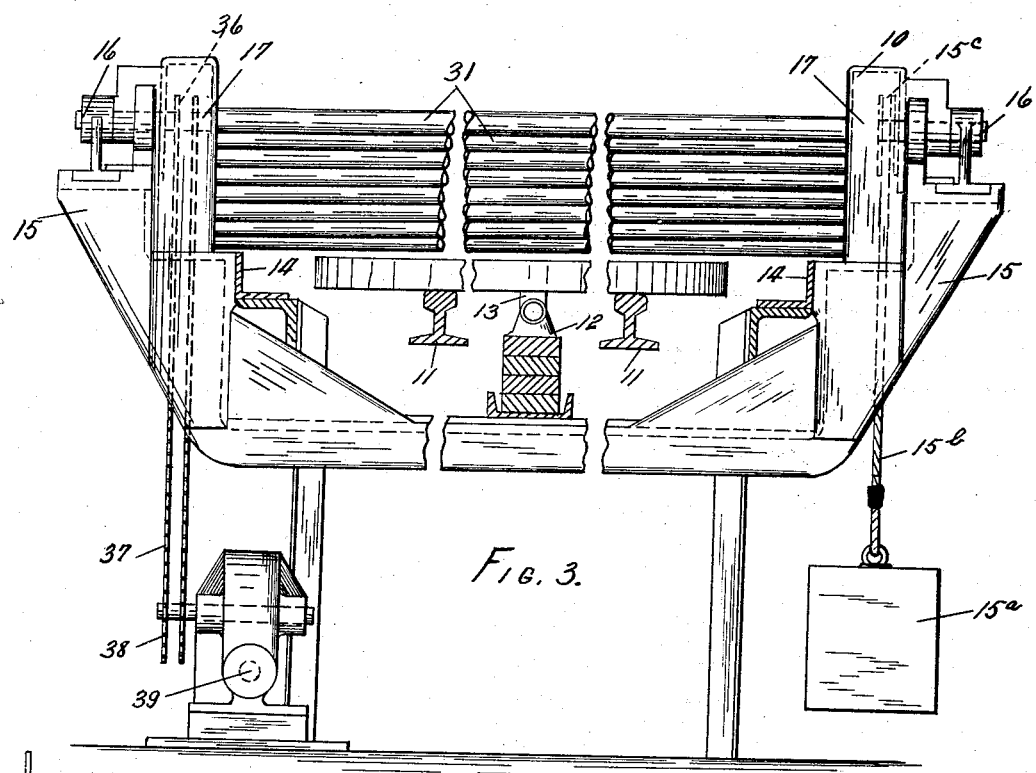
Figure 3 is a section on line 3—3 of Figure 1.
Figure 4:
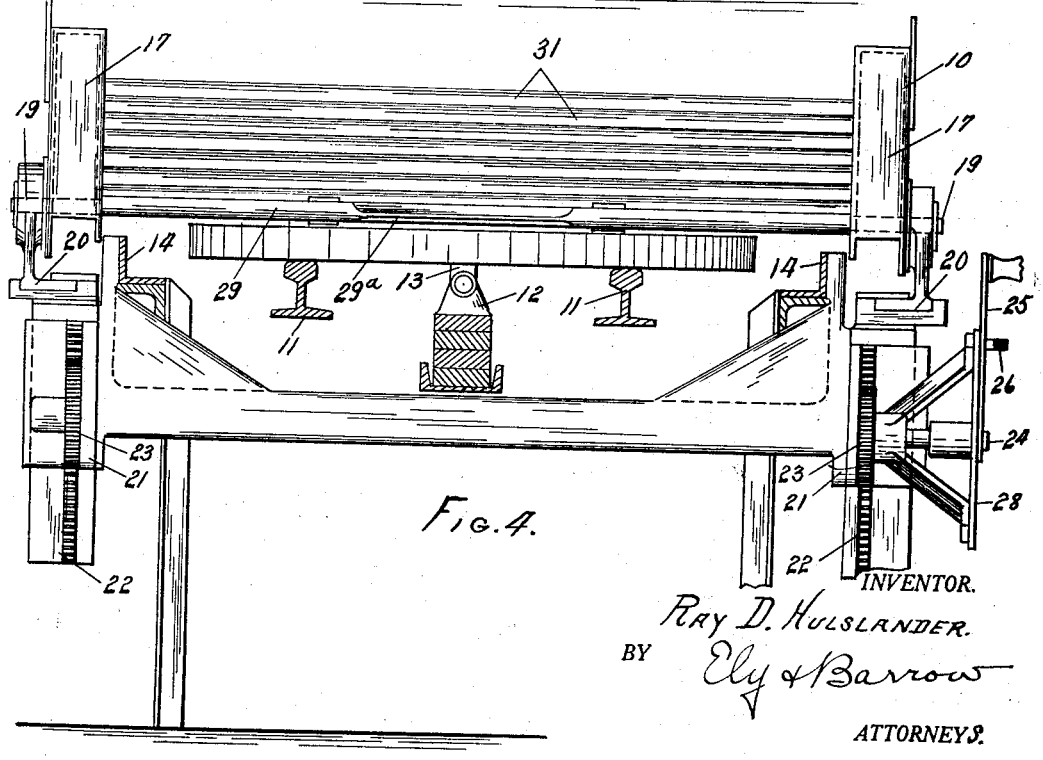
Figure 4 is a section on line 4—4 of Figure 1.

Referring to the drawings, the numeral 10 designates the usual conveyor employed in tire factories about a series of vulcanizers (not shown) which includes rails 11, 11 on which the molds slide, a driven chain 12 with dogs or lugs 13 thereon for engaging the molds and sliding them along rails 11 and guards 14, 14 at the sides of the conveyor. Above the portion of conveyor 10 here shown there is an elevated conveyor (not shown) for carrying the mold lids as will be understood.

Arranged above conveyor 10 is a bracket 15 pivoted at 16, 16 and having a pair of arms 17, 17 at each side of conveyor 10 extending along the conveyor in a direction opposite to that in which the lower sections 18 of the molds travel, the ends of said arms 17 being pivotally mounted at 19, 19 in vertically adjustable brackets 20, 20 at each side of the conveyor. Brackets 20 are longitudinally slidable on gibs 21, 21 which are vertically adjustable by racks 22, 22 with which are meshed pinions 23, 23 on a shaft 24 operable by a crank 25. Crank 25 is adapted to be locked in an adjusted position by suitable well-known means, such as a spring-pressed pin 26 engageable in apertures 27, 27 in a fixed annulus 28. In order to counterbalance the bracket 15 to facilitate adjustment thereof, a counter weight 15ª may be connected thereto by a flexible element 15ᵇ.

The stripping element of the device comprises a rotatable shaft 29 journaled between the ends of arms 17 and having a comparatively short central portion 29ª grooved as indicated, or otherwise formed to provide substantial frictional engagement with the periphery of a tire in a mold moving on the conveyor through the stripping apparatus, the grooves preferably being so formed as to provide slightly hooked portions at 29ᵇ having a lifting action on the tires in the molds when the shaft is turning upwardly with respect to the advancing periphery of the tire. Suitable bolsters 30 are provided on the side of the shaft 29 opposite the advancing tires to support the shaft against the heavy stresses applied thereto when the tires are being stripped.

A series of conveying rollers 31, 31 are also journaled between arms 17 to receive the tires as they are being stripped and to convey them off the mold conveyor. Roller 29 and rollers 31 are arranged to be driven by a chain 32 trained over sprockets 33, 33 secured to said rollers, the chain being held in operative engagement with said sprockets by idlers 34, 34 between sprockets 33 above the chain and idlers 35, 35 below the sprockets 33, the upper end of rollers 31 having an additional sprocket 36 secured thereto which may be driven by a chain 37 trained over a drive sprocket 38 driven through suitable reduction gearing 39 by a motor 40.

In order to retain the tires on the stripping device as they are being stripped so that they will fall onto rollers 31 and pass upwardly off the stripper, a series of idler rollers 41, 41 are arranged above the rollers 31 on side brackets 42, 42 to be engaged by the tires as they are turned upwardly out of the molds by the stripping element, and to guide them over rollers 31.

The stripping device described above is arranged to deliver the tires onto a conveyor 43 including spaced side members having rollers 44, 44 journaled therein, the conveyor 43 preferably curving from over the conveyor 10 to deliver the tires to one side thereof, the rollers 44 being radially directed with respect to the curve of the conveyor. A train of gears 45, 45 are mounted on rollers 44, alternate gears respectively being secured thereto and idling thereon whereby alternate rollers 44 are driven in the same direction. Due to the radial arrangement of the rollers the tires are caused automatically to follow the curved path of this conveyor.

The curved conveyor 43 delivers the tires at one side of conveyor 10, as for example onto straight conveyor 46 provided with rollers 47, 47 over which the tires pass. The tires may be removed from this conveyor or may pass therefrom through suitable conveying apparatus (not shown) to another point in the tire factory.

Figure 6:
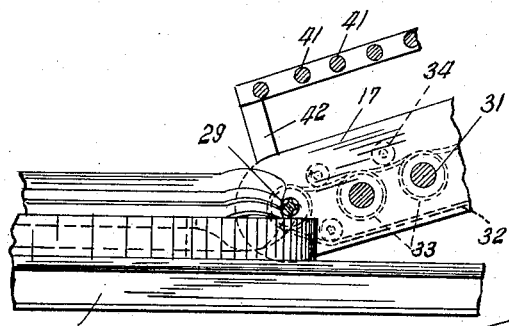
Figures 6, 7 and 8 are longitudinal sections through the stripping device showing the action of the device in stripping a tire.
Figure 7:
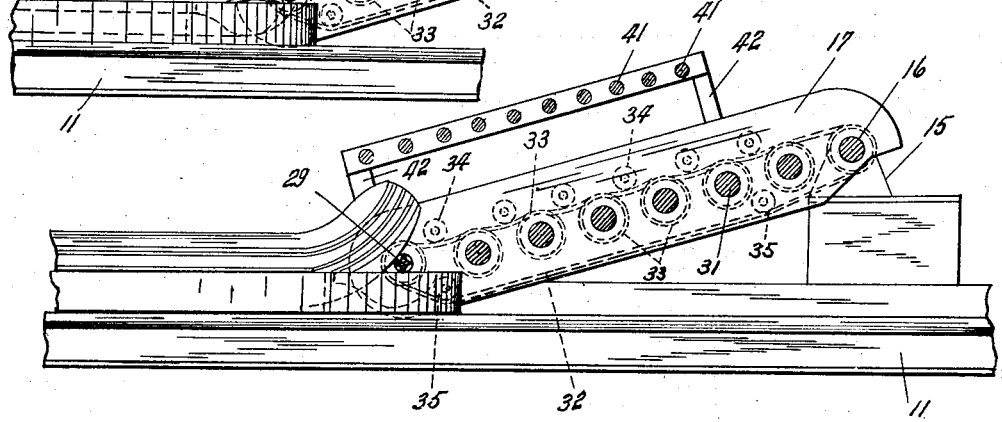
Figure 8:
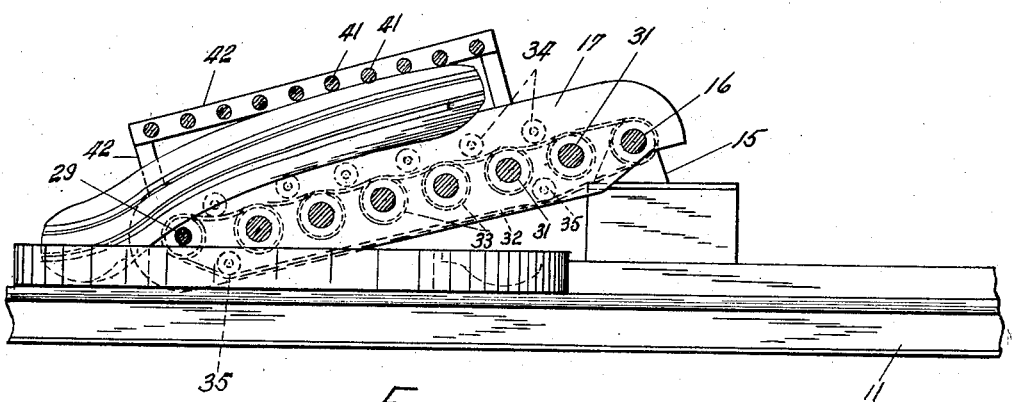

In operation, it will be understood that the conveyor 10 is driven to carry the molds to and from the vulcanizers and that as the open molds pass through the stripping apparatus, the peripheries of the tires are forced against element 29 which is continuously driven. As shown in Figure 6, this causes the portion 29ᵃ of element 29 to be depressed into the periphery of the tire and the upward frictional force of the element pulls the advancing end of the tire out of the advancing end of the mold as indicated in Figure 7, so that continued travel of the mold causes the tire to pass up over element 29, Figure 8. The tire, due to the travel of the molds and the lifting action of element 29 is forced up against rollers 41 as it is being stripped. As the stripping action is completed, the tire snaps up out of the mold, the additional friction of portion 29ᵃ again coming into play to provide the increased friction required to pull the following end of the tire free of the mold.

As will be apparent, the more positive action of portion 29ᵃ on element 29 is required to remove the advancing and following end portions of the tire from the molds, since these portions of the tires extend arcuately transversely of the general direction of mold travel, whereas the intermediate arcuate portions of the tire, extending arcuately in the general direction of travel, are removed with comparative ease by merely being passed over the smooth portions of element 29.

When the stripping is completed, the tires drop onto rollers 31 which are continuously driven, and are conveyed by these onto the curved conveyor 43, alternate rollers of this conveyor being also continuously driven, whereby the tires are finally delivered to conveyor 46 where they may be removed or from which they may be conveyed to some other location in the factory.

When lots of molds of different sizes are used on conveyor 10, the height of stripping element 29 is capable of being adjusted by crank 25, which is unlatched and swung the required amount in either direction and relatched in the desired position. By this means also, the element 29 may be moved upwardly to clear a lot of closed molds which occasionally pass through the complete conveyor circuit without being subjected to treatment in the vulvanizers and accordingly are not opened as usual to remove the tires.

The invention provides a simple effective apparatus for automatically removing tires from vulcanizing molds and reduces the number of tires injured by the stripping operation as heretofore practiced. Obviously numerous modifications of the invention may be resorted to without departing from the spirit thereof or the scope of the appended claims.

What is claimed is:

1. The combination with a vulcanizing mold conveyor of means for stripping flexible rubber articles from the vulcanizing molds, comprising a continuously rotatable element mounted over the molds against which the articles are adapted to be forced by the mold conveyor, said element rotating upwardly with respect to the advancing surface of the article to progressively pull the article out of the mold whereby it passes over said element as the mold travels, and means for conveying the stripped articles to one side of the mold conveyor.

2. The combination with a vulcanizing mold conveyor of means for stripping flexible rubber articles from the vulcanizing molds, comprising a continuously rotatable element mounted over the molds against which the articles are adapted to be forced by the mold conveyor, said element rotating upwardly with respect to the advancing surface of the article to progressively pull the article out of the mold whereby it passes over said element as the mold travels, and means for conveying the stripped articles from the stripping means.

3. The combination with a vulcanizing mold conveyor of means for stripping flexible rubber articles from the vulcanizing molds, comprising a continuously rotatable element mounted over the molds against which the articles are adapted to be forced by the mold conveyor, said element rotating upwardly with respect to the advancing surface of the article to progressively pull the article out of the mold whereby it passes over said element as the mold travels.

4. The combination with a vulcanizing mold conveyor of means for stripping flexible rubber articles from the vulcanizing molds, comprising a continuously rotatable element mounted over the molds against which the articles are adapted to be forced by the mold conveyor, said element rotating upwardly with respect to the advancing surface of the article to progressively pull the article out of the mold whereby it passes over said element as the mold travels, said stripping element being adjustable relative to said mold conveyor.

5. The combination with a vulcanizing mold conveyor of means for stripping flexible rubber articles from the vulcanizing molds, comprising a continuously rotatable element mounted over the molds against which the articles are adapted to be forced by the mold conveyor, said element rotating upwardly with respect to the advancing surface of the article to pull the article out of the mold, said stripping element being adjustable relative to said mold conveyor.

6. The combination with a vulcanizing mold conveyor of means for stripping flexible rubber articles from the vulcanizing molds, comprising a continuously rotatable element mounted over the molds against which the articles are adapted to be forced by the mold conveyor, said element rotating upwardly with respect to the advancing surface of the article to pull the article out of the mold.

7. The combination with a conveyor for vulcanizing molds for making annular flexible rubber articles of means for stripping said articles from said molds, comprising a continuously rotating stripping element extending transversely of the conveyor and adapted to be engaged by the advancing end portion of said article in a section of said mold, said element rotating upwardly with respect to the engaged surface of said article to pull it from the mold, the central portion of said element being of such rough or grooved formation as to have substantial purchase on the article at the leading and following end portions thereof to strip these portions of the article from the mold, and the portions of said element at either side of the central portion being comparatively smooth for stripping the intermediate portions of said article from the mold.

8. The combination with a vulcanizing mold conveyor of means for stripping flexible rubber articles from the vulcanizing molds, comprising a continuously rotatable element mounted over the molds against which the articles are adapted to be forced by the mold conveyor, said element rotating upwardly with respect to the advancing surface of the article to progressively pull the article out of the mold whereby it passes over said elements as the mold travels, conveying means for receiving the articles as they are being stripped from the molds, and means over said conveying means adapted to be engaged by the articles as they are turned upwardly by the stripping element to direct said articles onto the conveying means.

9. Apparatus for use in stripping tires from the molds in which they are vulcanized in combination with a tire mold conveyor, said apparatus including a bracket carrying continuously driven stripping element adapted to be engaged by the advancing peripheral portions of tires in mold sections so as progressively to strip the tires from the molds, and also carrying conveying means for the stripped tires, said bracket being inclined from the mold conveyor in the direction of mold travel, the stripper end of said bracket being adjustable toward and from the conveyor.

10. Apparatus for use in stripping tires from the molds in which they are vulcanized in combination with a tire mold conveyor, said apparatus including a bracket carrying continuously driven stripping element adapted to be engaged by the advancing peripheral portions of tires in mold sections so as progressively to strip the tires from the molds, and also carrying conveying means for the stripped tires, said bracket being inclined from the mold conveyor in the direction of mold travel, and means for conveying the tires from over the mold conveyor.

11. Apparatus for stripping articles from mold sections, comprising a continuously rotating element and means for relatively moving a mold section and said element to bring a surface of the article into contact with the side of said element which is rotating away from the mold section.

12. The combination with a mold conveyor of a rotatable shaft for stripping flexible articles from mold sections carried thereby, said conveyor and said shaft being operable by relative movement thereof to progressively strip an article from a mold section.

13. The combination with a conveyor for mold sections containing flexible depressible articles projecting from said sections, of a member traveling upwardly with respect to the conveyor in the path of the projecting portions of the articles whereby when the articles engage said member they are depressed thereby and lifted out of said mold sections by friction of the traveling member in the depressed portion of the article.

14. The combination with a tire mold conveyor for transporting tire mold sections containing vulcanized tires, portions of which project from said sections, of a member traveling upwardly with respect to said conveyor against which said portions are forced by the conveyor whereby said element depresses the tires which are lifted out of the mold sections by friction of the member in the depressed portion thereof.

In witness whereof I have hereunto affixed my signature this 22nd day of March, 1929.

RAY D. HULSLANDER.